Oct. 30, 1945.     J. J. GREBE ET AL     2,387,898
MAGNESIUM SALTS FROM SEA WATER
Filed Feb. 2, 1942     3 Sheets-Sheet 1

INVENTOR.
John J. Grebe
William C. Bauman
BY
Griswold & Burdick
ATTORNEYS

Patented Oct. 30, 1945

2,387,898

UNITED STATES PATENT OFFICE 2,387,898

MAGNESIUM SALTS FROM SEA WATER

John J. Grebe and William C. Bauman, Midland, Mich., assignors to The Dow Chemical Company, Midland, Mich., a corporation of Michigan Application February 2, 1942, Serial No. 429,185

14 Claims. (Cl. 23—50)

This invention concerns certain improvements in the recovery of magnesium and its salts from sea water or similar brines. It particularly concerns a method whereby the magnesium ions in sea or ocean water may economically be concentrated without resorting to excessive evaporation.

In the water purification art it is common practice to soften water, e. g. to remove alkaline earth metal ions, by passing the water through a bed of a base exchange agent such as sodium aluminum silicate. During such treatment the alkali metal ions of the base exchange agent are displaced by the alkaline earth metal ions in the water so that the water is depleted of alkaline earth metal ions, but enriched in alkali metal ions. When necessary the base exchange agent is treated with a dilute aqueous solution of sodium chloride or other alkali metal salt to effect displacement of the alkaline earth metal ions by alkali metal ions and thus regenerate the base exchange agent in a form suitable for re-employment in softening water.

We have found that base exchange agents may advantageously be used to absorb magnesium ions from sea water (or from other brines which contain between 0.01 and 0.4 gram atomic weights of magnesium ions per liter and contain between 2 and 40 grams atomic weights of alkali metal ions per gram atomic weight of the magnesium ions) and that the magnesium ions may thereafter be displaced from the base exchange agent and be recovered in much higher concentration than in the initial brine. The relatively concentrated magnesium salt solution thus regenerated may economically be evaporated to crystallize and recover the magnesium salt therefrom, which salt may, if desired, be electrolyzed or otherwise treated to produce metallic magnesium. Accordingly, the invention provides a simple and economical method for the production of magnesium and its salts from sea water, which method avoids a large part of the evaporation that would be required in order to recover the crystalline magnesium salts from sea water by direct evaporation and crystallization procedures only.

Insofar as we are aware such use of a base exchange agent to collect magnesium ions from sea water has not heretofore been known, and its utility for this purpose could not well have been foreseen. In this connection it will be noted that in the usual employment of a base exchange agent for softening water, there is alternate displacement of alkali metal ions from the exchange agent by magnesium or other alkaline earth metal ions and displacement of the absorbed alkaline earth metal ions by alkali metal ions. The reaction involved is reversible and the direction in which it proceeds is dependent upon the concentrations of the alkali metal and alkaline earth metal ions present. Since sea water contains a far higher concentration of sodium ions than of magnesium ions, absorption of the magnesium ions by an exchange agent was not to be expected. This fact is brought out in U. S. Patent No. 1,722,603 wherein it is taught that a base exchange agent, after becoming spent by use in softening water, may be reconditioned by treatment with sea water. Such reconditioning would involve the displacement of alkaline earth metal ions from the exchange agent by the sodium ions in the sea water; an effect different from that obtained in the present process. This difference in result is of course due to a difference in the magnesium content of the base exchange agent when contacted with the sea water. It may also be mentioned that the rate of the reaction for the displacement of ions from a base exchange agent, e. g. for the displacement of magnesium ions by sodium ions, is restricted by the rate at which the brine diffuses into the exchange agent, which is usually slow. Accordingly, in usual water softening operations where the spent agent is reconditioned by a fairly rapid flow of a sodium chloride solution over the same, it is common practice, in order to avoid waste of sodium chloride and to obtain more rapid diffusion into the exchange agent, to employ the sodium chloride in dilute solution, e. g. in the form of an aqueous sodium chloride solution of about 5 per cent concentration. However, in the present process for the concentration of the magnesium ions in sea water, the use of such dilute sodium chloride solution to liberate the magnesium ions collected on a base exchange agent would be futile, since the magnesium ions in the resultant salt solution would be of little or no higher concentration than in sea water. To be satisfactory for such purpose in the present process, a sodium chloride solution should be of 10 per cent concentration or higher, advantageously of greater than 15 per cent concentration.

We have further found that both the rate and the direction of the reversible reaction involved in the displacement of magnesium ions from an exchange agent by alkali metal ions, or vice versa, are dependent not only upon the relative proportions of the alkali metal and the magnesium ions in each phase of the reaction mixture, but also upon their actual concentrations in each of these phases. Thus, when a base exchange agent fails to absorb magnesium ions from a brine containing the same and a higher concentration of alkali metal ions, the desired absorption reaction may often be effected by diluting the brine with fresh water. Our researches indicate that the reversible reaction involved may be represented by the equation:

$$\frac{(A_s^+)^2}{Mg_s^{++}} = K\left[\frac{(A_B^+)^2}{Mg_B^{++}}\right]$$

wherein $A_s^+$ and $Mg_s^{++}$ represent the respective concentrations, e. g. in gram atomic weights per liter, of the alkali metal and the magnesium ions in the brine contacted with a base exchange agent, $A_B^+$ and $Mg_B^{++}$ represent the respective concentrations of these same ions (e. g. as gram atomic weights per chemical equivalent weight of the exchange agent) chemically combined with the base exchange agent and K is a constant.

We have still further found that the actual concentrations of magnesium and alkali metal ions in sea water are not those most favorable for absorption of the magnesium ions by a base exchange agent, and that by diluting sea water with fresh water prior to contacting it with the base exchange agent, the amount of magnesium which is absorbed per pound of the base exchange agent may be improved markedly and the maximum concentration of magnesium ions in the solution obtained by subsequent treatment of the spent exchange agent with an alkali metal salt solution may also be increased.

We have noted that in the step of liberating magnesium ions from a base exchange agent, e. g. by flow of an aqueous sodium chloride solution over the agent, the concentration of magnesium ions in the first portions of liquor flowing from the agent is low, but that as the flow continues the concentration of magnesium ions increases to a maximum value and then drops off. We have found that the magnesium salt solution thus regenerated may advantageously be divided into portions as it flows from the exchange agent, the mid-portion which is richest in magnesium ions being reserved for evaporation or other treatment to recover the magnesium salts therefrom, and the portions poorest in magnesium ions being treated, if necessary, with an additional amount of an alkali metal salt to increase the concentration of alkali metal ions therein, and being used for the further treatment of an exchange agent to liberate magnesium ions from the latter. By this procedure the amount of magnesium ions recovered in usable form and the concentration of such ions in the regenerated salt solution may be increased and the amount of sodium chloride which need be added as such or as a concentrated sodium chloride solution may be reduced.

In the accompanying drawings.

Figures 1, 2:
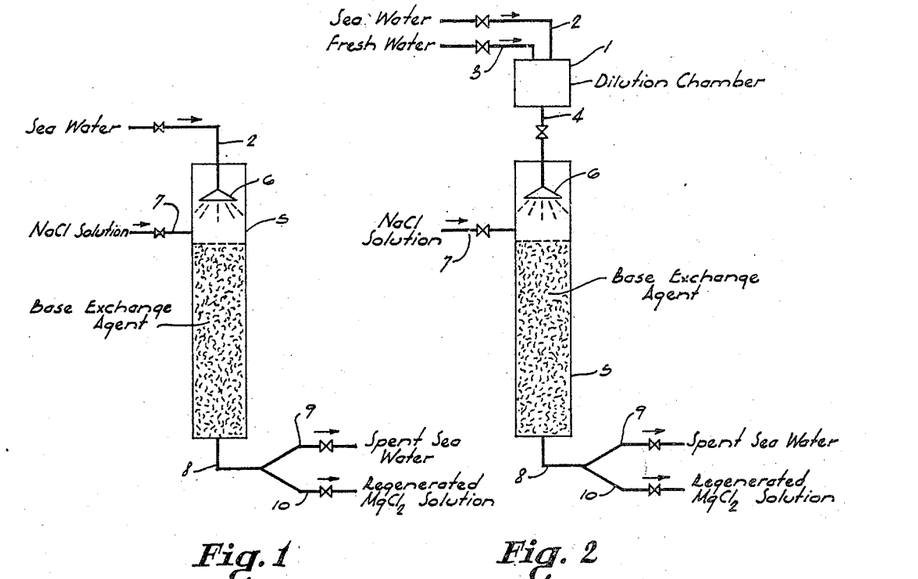
Figs. 1, 2, and 3 are diagrammatic sketches showing certain of the various forms and arrangements of apparatus which may be used in practicing the invention.

In Fig. 1 the numeral 5 designates a reaction chamber which is charged with a granular base exchange agent as indicated and is provided near its top with an inlet 2 for sea water, which inlet terminates in a distributor head 6 situated inside of the chamber. Chamber 5 is also provided at a point near its top with an inlet 7 for a sodium chloride solution or other agent for displacing magnesium ions from the base exchange agent. A conduit 8 leading from the bottom of chamber 5 branches into the valved lines 9 and 10 which serve as outlets for the spent sea water and regenerated magnesium salt solution, respectively.

The apparatus shown in Fig. 2 is similar to that of Fig. 1 except for the addition of a fresh water inlet 3 leading to a dilution chamber 1 which is interposed between the sea water inlet 2 and the reaction chamber 5, and in both figures similar parts are similarly numbered.

Figure 3:
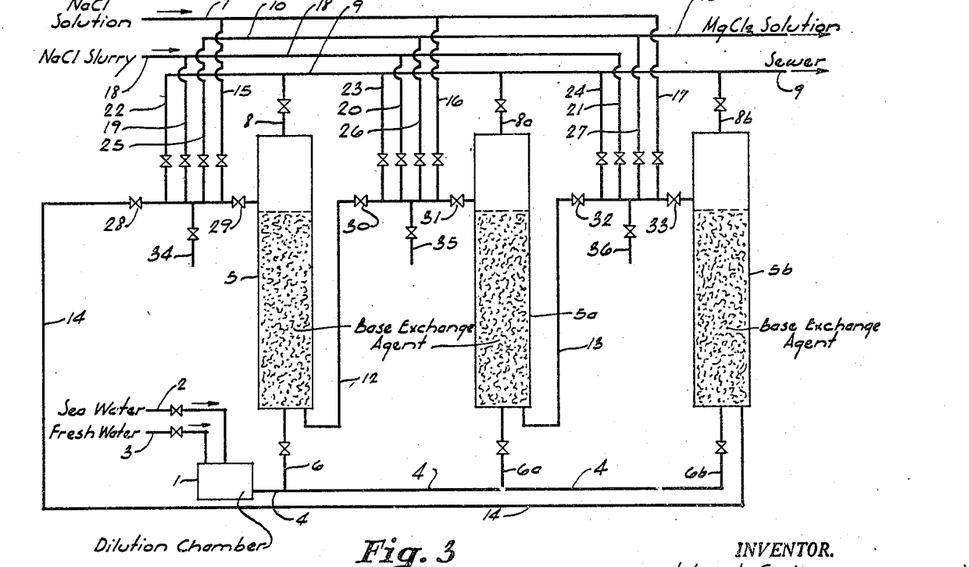

In Fig. 3 of the drawings, the numeral 1 designates a dilution chamber which is provided with the valved inlets 2 and 3 for sea water and fresh water, respectively. A line 4 leads from chamber 1 and connects with three valved lines 6, 6a, and 6b which, in turn, connect with the lower ends of reaction chambers 5, 5a, and 5b, respectively. The latter are, of course, charged with a granular base exchange agent. The chambers 5, 5a, and 5b are provided at their upper ends with outlets 8, 8a, and 8b, respectively, leading to the sewer line 9. Leading from the lower ends of chambers 5, 5a, and 5b are lines 12, 13, and 14 which connect with the respective chambers 5a, 5b, and 5 near the top of each. Line 14 is provided with the valves 28 and 29; line 12 is provided with valves 30 and 31; and line 13 is provided with valves 32 and 33. The lines 14, 12, and 13 are also provided with the respective valved outlets 34, 35, and 36 for withdrawing samples of liquor therefrom. An inlet line 7 is provided with the valved branch lines 15, 16, and 17 which connect with lines 14, 12, and 13, respectively. Another inlet line 18 is provided with valved branch lines 19, 20, and 21 which also connect with the respective lines 14, 12, and 13. Valved lines 22, 23, and 24 branch from the respective lines 14, 12, and 13 and connect with the sewer line 9. Also, the valved lines 25, 26, and 27 branch from the respective lines 14, 12, and 13 and lead to an outlet line 10.

It will be understood that the apparatus shown in Figs. 1, 2, and 3 may be modified or other forms of apparatus may be used in practice of the invention. For instance, in place of the single chamber apparatus of Figs. 1 or 2, a multi-chamber apparatus having any desired number of reaction chambers may be employed. One of the ways in which the reaction chambers of a multi-chamber apparatus may be connected is illustrated in Fig. 3 of the drawings.

Figure 4:
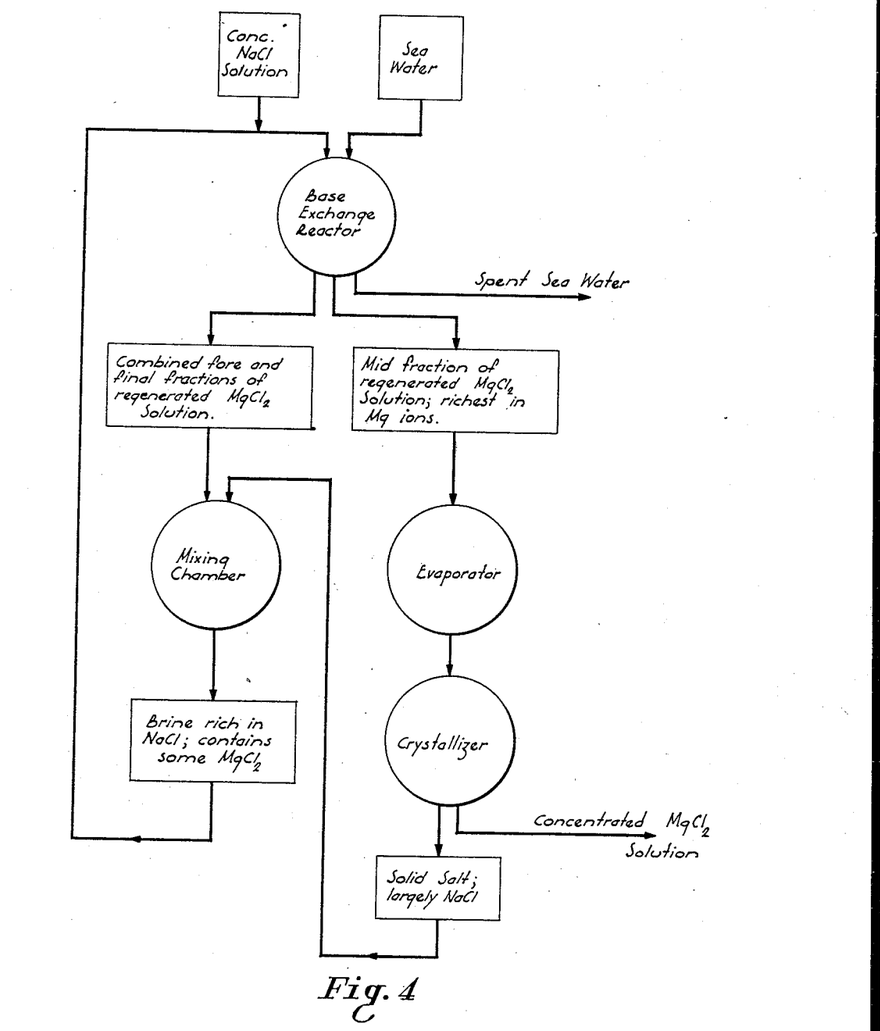
Fig. 4 is a flow sheet showing a preferred flow of materials when practicing the invention with apparatus such as that shown in Fig. 3.

The flow sheet shown in Fig. 4 of the drawings is almost self-explanatory. However, it should be mentioned that the sea water and the concentrated sodium chloride solution are fed alternately, not simultaneously, into the system and that the combined fore and final fractions of the regenerated magnesium chloride solution, i. e. the fractions of said solution which are poor in magnesium ions, are not recycled to the base exchange agent until the latter has been enriched in magnesium ions by passing ordinary or diluted sea water over the same. Once the process as outlined in the flow sheet has been placed in operation the introduction of the concentrated sodium chloride solution from an external source may be curtailed, since the sodium chloride which is recovered in a given cycle of the process is used for the displacement of magnesium ions from the base exchange agent in the next cycle.

Although any of the usual base exchange agents (also known as cation exchange agents) such as sodium aluminum silicate, potassium aluminum silicate, green sand, sulphonated coal, sulphonated lignite, and synthetic resins containing carboxy or sulphonic acid radicals, e. g. sulphonated phenol-formaldehyde resins containing the sulphonic acid radicals attached to the aromatic nucleus or to an aliphatic portion of the molecule, sulphonated tannin-formaldehyde resins, or the resinous products obtained by polymerizing styrene or other vinyl compound in the presence of maleic anhydride or in the presence of a mixture of maleic anhydride and ethylene glycol, may be used in the process, such agents vary widely as regards the convenience and economy with which they may be employed. To be best suited to the purpose, the base exchange agent should have a high absorption capacity for magnesium ions, should swell or shrink only moderately or not at all during use, and should be one from which a large proportion of the absorbed magnesium ions may rapidly and economically be displaced, e. g. by alkali metal or hydrogen ions. The sulphonated organic resins and particularly Amberlite IR-1 (i. e. a sulphonated phenol-formaldehyde resin) possess these desirable properties to a large extent and are preferred.

In practicing the invention with apparatus such as that illustrated in Fig. 1 of the drawings, sea or ocean water is passed through a bed of the granular base exchange agent until the magnesium content of the brine flowing from the bed is nearly the same as that of the sea water entering the bed. This operation for absorbing magnesium ions from the sea water is usually most economically carried out without heating of the brine, but the rate of the absorption reaction may be increased, if desired, by heating the sea water before passing it over the exchange agent. After the exchange agent has absorbed its capacity of magnesium ions, the flow of sea water is discontinued and an aqueous sodium chloride solution of 10 per cent concentration or higher is passed through the bed to cause chemical displacement of magnesium ions from the exchange agent by the sodium ions of the sodium chloride and thus to regenerate a magnesium chloride solution containing the magnesium ions in higher concentration than in sea water. To avoid the cost of heating, this reaction also is usually carried out at room temperature or thereabout, although it occurs more rapidly and favorably at higher temperatures.

The concentration of magnesium ions in the regenerated magnesium chloride solution increases, of course, with increase in the concentration of the sodium chloride solution used to regenerate the magnesium chloride. Accordingly, we usually employ an aqueous sodium chloride solution of 15 per cent concentration or higher, preferably a saturated solution of about 26 per cent concentration, to regenerate the magnesium chloride. The concentration of magnesium ions in the regenerated magnesium chloride solution is also highest when the sodium chloride solution is held in contact with the base exchange agent for a time sufficient to establish a condition of equilibrium between the alkali metal and the magnesium ions in solution and those chemically combined with the exchange agent. Another important factor which influences the concentration of magnesium ions in the regenerated magnesium chloride solution is the extent to which the latter becomes mixed with and diluted by sea water during travel through the bed of exchange agent. In this connection it may be mentioned that following the initial step of passing sea water over the exchange agent the latter is, of course, saturated therewith. The amount of sea water thus retained in the exchange agent may be sufficient to cause considerable dilution of the regenerated magnesium chloride solution if it becomes mixed with the latter. Also, the volume of concentrated sodium chloride solution required for regeneration of the magnesium chloride is often less than the volume of the bed of exchange agent, so that it may be most convenient not only to flush sea water from the bed with the concentrated sodium chloride solution, but also to flush the latter from the bed with the sea water used in the next cycle of the process. Accordingly, unless care is taken, the regenerated magnesium chloride solution may be diluted excessively by the flows of sea water which precede and follow flow of the same through the bed. For these reasons the bed or beds of exchange agent through which the sodium chloride solution is passed may advantageously be of 5 times or greater depth than diameter. By passing the aqueous sodium chloride solution through such bed at a rate which permits smooth flow without excessive eddying, time may be permitted for the reaction to proceed nearly to the equilibrium condition and mixing and dilution of the liquor with sea water may be held at a minimum.

Because of dilution by the sea water present in the exchange agent, the first portions of the regenerated magnesium chloride solution may contain the magnesium ions in undesirably low concentration, but the concentration of magnesium ions increases as the flow is continued until it reaches a maximum value, after which it gradually decreases due to depletion of the magnesium ions which had been absorbed in the exchange agent. Accordingly, the mid-portion of the regenerated magnesium chloride solution is richest in magnesium ions and it is desirable that this portion be collected separately from those which precede and follow it. By careful operation as just described, in one cycle of the process 70 per cent or more of the magnesium ions which had been absorbed from sea water by the exchange agent may readily be recovered in the more concentrated mid-portion of the regenerated magnesium chloride solution, which mid-portion is of sufficient concentration to permit economical recovery of the magnesium chloride therefrom by usual evaporation and crystallization procedure. After treatment with the concentrated sodium chloride solution, the base exchange agent is, of course, reemployed to absorb a further quantity of magnesium ions from sea water.

After being resaturated with magnesium ions absorbed from the sea water, the exchange agent may advantageously be treated with the fore and final portions of the above-mentioned regenerated magnesium chloride solution which contain the magnesium chloride in undesirably low concentration. When these portions of regenerated magnesium chloride solution contain 10 per cent or more of sodium chloride they may be recycled as just described without adding sodium chloride thereto, but if they contain less than 10 per cent of sodium chloride additional sodium chloride is preferably added, e. g. in solid form or as an aqueous slurry, before recycling the liquor. In practice, the poorer fractions of the regenerated magnesium chloride solution which are to be recycled are usually treated with sufficient solid sodium chloride to increase the concentration of the latter to above 15 per cent and preferably 20 per cent. By thus recycling the poorer portions of a regenerated magnesium chloride solution to the exchange agent after resaturating the latter with magnesium ions from sea water, additional magnesium chloride is regenerated and the portions of liquor recycled are enriched in magnesium chloride.

The procedure in practicing the invention with the apparatus shown in Fig. 2 of drawings is similar to that just described with reference to Fig. 1, except that provision is made for diluting the sea water with fresh water so as to permit an increase in the proportion of magnesium absorbed by the exchange agent and a resultant increase in the concentration of the subsequently regenerated magnesium chloride solution. In using the apparatus of Fig. 2, undiluted sea water is preferably passed over the exchange agent until the latter is saturated, or nearly saturated, with absorbed magnesium ions after which the inflowing sea water is diluted gradually, or in step-wise manner, with increasing amounts of fresh water so as to cause a further absorption of magnesium ions by the exchange agent. The sea water finally passed through the bed may advantageously be diluted with at least 1 and preferably from 2 to 5 parts or more by volume of water. By operating in this manner a minimum volume of brine need be pumped through the system.

In practicing the invention with apparatus such as that illustrated in Fig. 3 of the drawings, the procedure outlined in the flow sheet shown as Fig. 4 may advantageously be followed. Undiluted sea water is introduced through inlet 2, chamber 1 and lines 4, 6, 6a, and 6b into the reaction chambers 5, 5a, and 5b which contain the granular base exchange agent. The brine flows in parallel manner upwardly through the chambers, thereby washing any occluded dirt from the exchange agent, and causing classification of the latter into strata according to the particle size so as to restrict loss of the exchange agent by abrasive wear at the same time that the exchange agent is reacting chemically to absorb magnesium ions from the brine. As will be apparent, the parallel, rather than series, flow of the sea water through the chambers is desirable since it results in an increase in the volume of brine which may be treated in unit time. The spent sea water flows from the reaction chambers through lines 8, 8a, and 8b to the sewer line 9. During this treatment with sea water, the valves in lines 12—14, 15—17, and 19—27 are, of course, closed.

Such passage of ordinary sea water is continued until the exchange agent is nearly saturated with absorbed magnesium ions (as evidenced by an increase in the magnesium content of the effluent brine), after which the inflowing sea water is diluted with fresh water in increasingly larger proportions so as to cause an increased absorption of magnesium ions by the exchange agent. Such operations are preferably continued until the sea water is diluted with 1 part by volume or more, usually from 2 to 5 parts, of water and the magnesium content of the brine flowing from the bed of the exchange agent is nearly the same as that of the brine entering the bed.

The valves in lines 6 and 8 are then closed and valve 29 in line 14, valve 30 in line 12, and also the valves in lines 15 and 23 are opened. A concentrated sodium chloride solution is introduced through inlet 7 and passes by way of lines 15 and 14 into chamber 5 near the top of the latter. In flowing downward through chamber 5 it forces the sea water remaining in the chamber to flow from the latter though lines 12 and 23 to the sewer line 9. Sufficient concentrated sodium chloride solution is introduced as just described to displace a large part of the magnesium ions which had been absorbed by the exchange agent in chamber 5 and thus regenerate magnesium chloride. The liquor flowing from chamber 5 is analyzed from time to time, e. g. by withdrawing samples thereof through outlet 35, and when its magnesium chloride content increases to a concentration higher than that in sea water the valves in lines 23, 6a, and 8a are closed and valve 31 in line 12 and the valves in lines 20 and 24 are opened, the valve in line 20 being controlled so as to introduce sufficient sodium chloride slurry from the inlet line 18 to resaturate the liquor flowing from line 12 with sodium chloride. By the operations just mentioned the flow of sea water through chamber 5a is discontinued and the downward flow of a concentrated sodium chloride solution (which now contains some magnesium chloride) is started. Close observation of the magnesium chloride content of the liquor flowing through line 12 is continued and when the concentration has increased to a value sufficient to warrant its evaporation for the recovery of solid magnesium chloride valve 31 and the valve in line 20 are closed, thereby stopping the flow to chamber 5a and also stopping introduction of the sodium chloride slurry. The valve in line 26 is opened so that the more concentrated mid-portion of the regenerated magnesium chloride solution then flows from line 12 through line 26 to the outlet line 10 and is collected for evaporation. When the magnesium chloride concentration in the liquor flowing through line 12 again decreases to a value lower than that desired in the liquor to be evaporated the valve in line 26 is closed and valve 31 and the valve of line 20 are again opened so as to resume the flow of liquor to chamber 5a and at the same time enrich this liquor with sodium chloride by the introduction of a sodium chloride slurry through lines 18 and 20.

It should be mentioned that when the amount of concentrated sodium chloride solution necessary for the displacement of magnesium ions from the exchange agent in chamber 5 has been introduced to the latter, the inflow of said solution is stopped by closing the valve in line 15, and the valve 28 in line 14 is opened for a time sufficient to permit a flow of sea water from chamber 5b through line 14 to the top of chamber 5 and downward through the latter so as to flush the concentrated sodium chloride solution from said chamber through line 12.

When the magnesium chloride concentration in the liquor flowing through line 12 has decreased to a value approximating that in sea water, the valves 28 and 29 in line 14, the valve in line 20 and the valve 30 in line 12 are closed and the valves in lines 6 and 8 are opened so as to cause an upward flow of sea water through chamber 5. The valve in line 16 is then opened to introduce into chamber 5a sufficient concentrated sodium chloride solution to complete the reaction for the displacement of magnesium ions from the exchange agent in said chamber. The introduction of the sodium chloride solution is then stopped by closing the valve in line 16, after which the valve 30 in line 12 is opened to permit a flow of sea water from chamber 5 to the top of chamber 5a and downward through the latter so as to flush the concentrated sodium chloride solution from chamber 5a. The passage of sea water through chamber 5a is then resumed, e. g. by closing the valves 30 and 31 in line 12 and valve 32 in line 13 and opening the valves in lines 6a and 8a.

During the period in which a concentrated sodium chloride solution is being passed downward through chamber 5a, the concentration of magnesium chloride in the liquor flowing from said chamber is observed closely and when said concentration increases above that in sea water the valve in line 24 is closed. At the same time or prior thereto, the flow of sea water through chamber 5b is discontinued, i. e. by closing the valves in lines 6b and 8b. The valve 28 in line 14 and also the valve in line 22 are opened so as to permit flow of liquor from the bottom of chamber 5b through lines 14 and 22 to the sewer line 9. Valve 32 in line 13 and also the valve in line 21 are opened so as to permit flow of the liquor from chamber 5a through line 13 to the upper end of chamber 5b and simultaneous enrichment of said liquor with sodium chloride by introducing a slurry of the latter through inlet 18 and line 21. Thereafter the operations involved during the flow of the regenerated magnesium chloride solution from the lower end of chamber 5a are similar to those above described with reference to the flow of such liquor from chamber 5, i. e. enrichment of the liquor with sodium chloride slurry and introduction of the resultant solution to chamber 5b is continued until the concentration of magnesium chloride in the liquor flowing through line 13 has increased sufficiently to warrant evaporation of the same, at which time the richest mid-portion of the regenerated magnesium chloride solution is withdrawn through lines 27 and 10, the enrichment of the liquor in line 21 with sodium chloride and its flow to chamber 5b then being resumed, etc.

When the concentration of magnesium chloride in the liquor flowing from chamber 5b through lines 14, 22 and 9 increases above that in sea water the valve in line 22 is closed and that in line 19 and also valve 29 in line 14 are opened to cause enrichment of the liquor by an inflow of the sodium chloride slurry through lines 18 and 19 and flow of the enriched liquor to the top of chamber 5. The subsequent operations for withdrawing the richest midportion of the regenerated magnesium chloride solution and of enriching the other portions with sodium chloride and introducing them into chamber 5 are similar to those hereinbefore described with reference to the handling of the regenerated magnesium chloride solution from each of the chambers 5 and 5a.

Thus, by alternating the flow of sea water from one chamber to another while passing a concentrated sodium chloride solution through the beds of exchange agent which have been treated with sea water and by withdrawing the richest midportion of the regenerated magnesium chloride solution from each bed, as just described, the process may be carried out continuously.

The mid-fractions of the regenerated magnesium chloride solution which are withdrawn through outlet 10 of the apparatus shown in Fig. 3 are particularly rich in magnesium ions. As indicated by the flow sheet in Fig. 4 of the drawings, they may be evaporated to further concentrate the dissolved magnesium chloride and to crystallize alkali metal salts (principally sodium chloride) therefrom. The salts thus crystallized may be used to make up the slurry which is introduced to the system through inlet 18 of Fig. 3. The concentrated magnesium chloride solution obtained as the mother liquor from the crystallization may be further evaporated to recover the magnesium chloride in crystalline form and the magnesium chloride thus obtained may be electrolyzed or otherwise treated to produce metallic magnesium.

The process as hereinbefore described may be modified in any of a number of ways. For instance, instead of using a solution of sodium chloride to displace the magnesium ions from a base exchange agent, other alkali metal salts or mineral acids, e. g. ammonium chloride, potassium chloride, sodium, potassium, or ammonium sulphate, sodium or potassium nitrate, sodium or potassium acetate, hydrochloric acid, or sulphuric acid, etc., may be used to cause the displacement. The acid radical of the regenerated magnesium salt corresponds, of course, to that of the agent used to displace the magnesium ions from the exchange agent, e. g. the use of sulphuric acid or sodium sulphate to effect the displacement reaction results in the formation of magnesium sulphate whereas the use of hydrochloric acid or sodium chloride to effect the displacement reaction results in the formation of magnesium chloride. Accordingly, the invention permits the economical recovery of magnesium ions from sea water in the form of any desired water-soluble magnesium salt.

The agent used in the displacement reaction should, of course, be sufficiently concentrated so that the regenerated magnesium salt solution will contain the magnesium ions in higher concentration than in sea water. Depending upon whether an alkali metal salt or a mineral acid is used to effect the displacement of magnesium ions from an exchange agent, the latter is converted into the form of its alkali metal salt or into its acid form, respectively. Either of these forms of the exchange agent may be used for the absorption of magnesium ions from sea water, but the salt form is usually the more rapidly reactive and is preferred. It may be mentioned that calcium chloride and other soluble calcium salts may be used to displace magnesium ions from an exchange agent, but that the resultant calcium salt of the exchange agent is sluggish as regards its action in reabsorbing magnesium ions from sea water. Accordingly, alkali metal salts are preferably used to effect the displacement of magnesium ions from an exchange agent.

By the ion exchange method herein disclosed the magnesium ions of sea water may readily and economically be concentrated by ten-fold or more, thus avoiding the necessity for evaporating more than a minor fraction of the amount of water present in sea water in order to recover the magnesium in the form of a crystalline salt. As explained above, the invention is further advantageous in that it permits recovery of the magnesium ions from sea water in the form of any desirable water-soluble magnesium salt.

The following examples describe certain ways in which the principle of the invention has been applied, but are not to be construed as limiting the scope of the invention.

EXAMPLE 1

Figure 5:
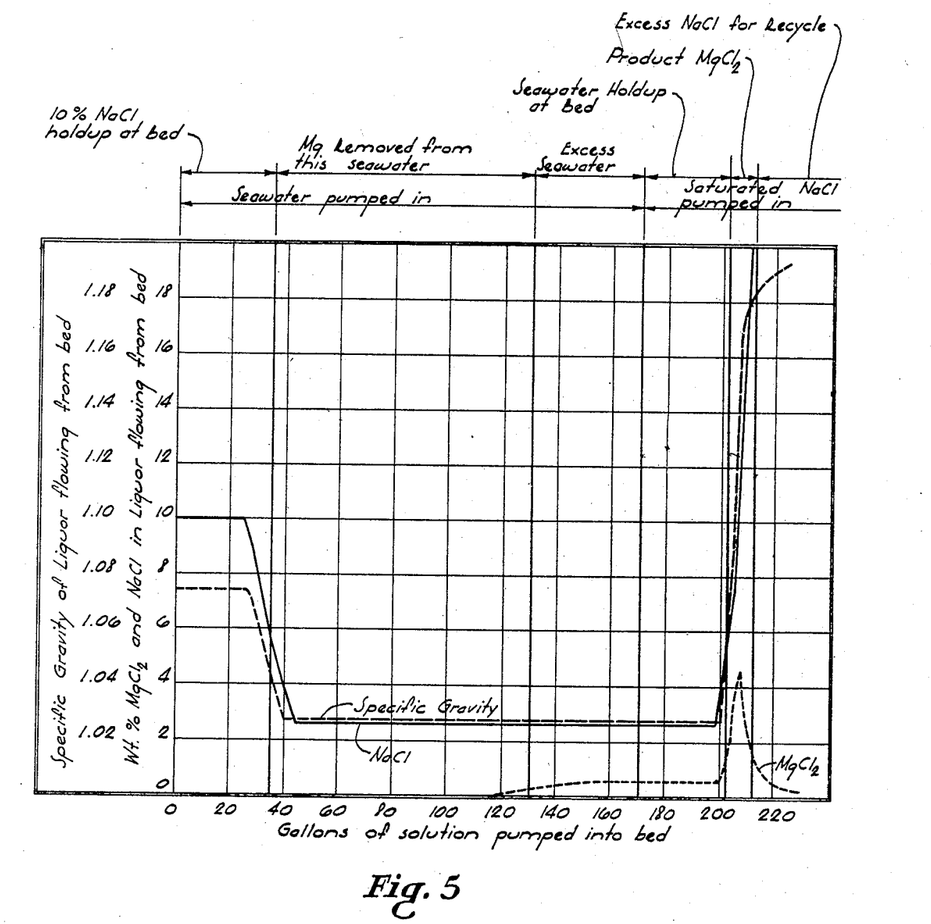
Fig. 5 is a graph showing the results actually obtained in practice of the invention as described in the Example 1 hereinafter presented, using simple apparatus similar to that illustrated in Fig. 1.

Ordinary sea water containing approximately 2.6 per cent by weight of sodium chloride and 0.5 per cent of magnesium chloride together with the smaller amounts of various other salts usually present in sea water, was passed at a rate of 0.943 gallon per minute through a series of 5 beds of the granular base exchange agent, Amberlite IR-1 (a sulphonated phenol-formaldehyde resin), each of which beds was 5 feet in depth and of approximately 0.2 square foot cross-section and each of which beds had, prior to introduction of the sea water, been saturated with an aqueous sodium chloride solution of 10 per cent concentration. A total of 170 gallons of sea water was passed into the beds of exchange agent. The flow of sea water was then discontinued and approximately 60 gallons of a saturated aqueous sodium chloride solution, i. e. of 26 per cent concentration, was fed into the beds at a rate of 0.321 gallon per minute for the purpose of displacing from the exchange agent the magnesium ions which had been absorbed from the sea water and thus regenerating magnesium chloride. On initially introducing the sea water, the first 25 gallons of brine to flow from the beds consisted of the 10 per cent sodium chloride solution with which the beds had previously been saturated. During flow of the next 15 gallons of brine from the beds, the sodium chloride content of the effluent brine decreased from 10 per cent to 2.6 per cent and the specific gravity decreased from 1.075 to 1.026, i. e. to the sodium chloride content and the specific gravity of the sea water. The magnesium chloride content of the effluent brine was practically nil and remained so until a total of 115 gallons of brine (including the 10 per cent sodium chloride solution initially flushed from the exchange agent) had been withdrawn, showing that up to this point the exchange agent had efficiently absorbed magnesium ions from the sea water. During flow of the next 30 gallons of brine from the exchange agent, the magnesium chloride content of the brine flowing from the agent increased to 0.5 per cent by weight, i. e. to the magnesium chloride content of sea water, showing that the exchange agent had absorbed its capacity of magnesium ions from the ocean brine. However, an additional 55 gallons of brine having the composition of ordinary sea water flowed from the beds of exchange agent. A portion, i. e. about 25 gallons, of this effluent sea water represented excess brine which flowed freely through the beds without being acted upon and the remainder, i e. about 30 gallons, was sea water with which the exchange agent had become saturated but which had been flushed from the agent by the subsequent introduction of the saturated sodium chloride solution. As nearly as can be estimated, of the 200 gallons of effluent brine thus far collected, only 95 gallons may be regarded as sea water which passed through the beds of the exchange agent before the latter had become substantially saturated with magnesium ions absorbed from the brine. The absorption of magnesium ions from this 95 gallons of sea water was nearly quantitative and corresponded to approximately 4 pounds of magnesium chloride or about 1.02 pounds of magnesium. After withdrawal of the above mentioned 200 gallons of brine and during the period in which the saturated sodium chloride solution was being passed through the beds of the exchange agent, the composition of the effluent brine changed sharply. During withdrawal of the next 6.5 gallons of effluent liquor (i. e. to make a total of 206.5 gallons of effluent brine) the magnesium chloride content of the liquor flowing from the exchange agent increased from 0.5 per cent to 4.6 per cent and the specific gravity increased from 1.0265 to about 1.122. During flow of the next 23.5 gallons of liquor from the beds, i. e. to make a total of 230 gallons of effluent liquor, the specific gravity rose to about 1.195 but the magnesium chloride content of the liquor flowing from the exchange agent decreased to only 0.2 per cent. The 10 gallon portion of effluent liquor which was richest in magnesium chloride, i. e. that collected over the interval of from 202 to 212 gallons total recovered brine, contained approximately 3 per cent by weight of magnesium chloride and had a specific gravity of 1.115. It contained 2.8 pounds of magnesium chloride, i. e. approximately 69 per cent of the magnesium ions which had been absorbed by the exchange agent from the sea water. In effect, 69 per cent of the magnesium chloride content of 95 gallons of sea water had been concentrated in only 10 gallons of liquor. The experiment just described is illustrated graphically in Fig. 5 of the drawings.

EXAMPLE 2

A purpose of this example is to show the results obtained during practice of the invention in a cyclic manner. Another purpose is to illustrate the advantages of collecting the regenerated magnesium chloride solution (which also contains sodium chloride) as a series of successive fractions during its flow from an exchange agent and of replenishing the fore and final fractions (i. e. those containing magnesium chloride in lower concentration than the mid-fractions) with sodium chloride to form a concentrated solution of the latter and employing the resultant solution in a subsequent cycle of the process for the further displacement of magnesium ions from the exchange agent and the consequent regeneration of an additional amount of magnesium chloride. The exchange agent employed was Amberlite IR-1 (i. e. a sulphonated phenol-formaldehyde resin) in the form of a series of beds having a total depth of 27.75 feet and a total volume of 5.75 feet. The first cycle of operation involved passing undiluted sea water through the series of beds until the exchange agent was substantially saturated with magnesium ions absorbed from the sea water and then discontinuing the feed of sea water and introducing 17 gallons of a saturated aqueous sodium chloride solution into the beds at a rate of about 0.6 gallon per minute. The resultant regenerated magnesium chloride solution was collected as a series of fractions, each of about 1.5 gallons volume, as it flowed from the last bed of exchange agent. The mid-fractions, which were richest in magnesium chloride, were reserved for evaporation to recover solid magnesium chloride therefrom. The other fractions which were poorer in magnesium chloride than the mid-fractions but nevertheless contained the magnesium chloride in far higher concentration than in sea water were, except for the first of said fractions, treated with sufficient solid sodium chloride to form a concentrated and nearly saturated sodium chloride solution. In the second cycle of the process, sea water was again passed through the beds of exchange agent until the latter had absorbed its capacity of magnesium ions therefrom. The fore and final fractions of the regenerated magnesium chloride solution collected in the first cycle of operations (i. e. the fractions which though richer in magnesium chloride than sea water were of undesirably low magnesium chloride concentration and which, except for the first of said fractions, had been treated with solid sodium chloride) were then fed in the order in which they had been collected and at a rate of 0.6 gallon per minute into the series of beds of the exchange agent for the purpose of displacing absorbed magnesium ions from said agent and thereby enriching the liquor in regenerated magnesium chloride. A total of 8 such fractions, each containing 1.5 gallons of liquor were fed into the beds after which 5 gallons of a saturated aqueous sodium chloride solution was introduced for the purpose of completing the magnesium chloride regeneration reaction. The resultant regenerated magnesium chloride solution was again collected as successive 1.5 gallon fractions as it flowed from the exchange agent and these fractions were treated as in the first cycle of the process, i. e. the mid-fractions were reserved for evaporation and other fractions were treated with solid sodium chloride and returned to the exchange agent in the next cycle of the process. Each successive cycle was carried out in the same way as the second cycle just described. After several, e. g. 4 or 5, cycles of operation a condition of balance was established between the aqueous sodium chloride solution (including the recycled fractions of regenerated magnesium chloride solution) which was fed to the exchange agent in a given cycle and the quantity and concentration of the resultant regenerated magnesium chloride solution. Thereafter, the operating conditions and the results in each cycle were the same as those in the preceding cycle. The results obtained in a single cycle were then determined. Table I identifies the successive 1.5 gallon fractions of regenerated magnesium chloride solution obtained in a single cycle of the process by stating the per cent by weight of magnesium chloride and also of sodium chloride in each.

TABLE I

*Regenerated MgCl₂ solution*

| Fraction No. | MgCl₂ | NaCl |
| --- | --- | --- |
|  | Per cent | Per cent |
| 1 | 0.50 | 3.5 |
| 2 | 1.55 | 6.0 |
| 3 | 2.36 | 8.5 |
| 4 | 3.38 | 9.4 |
| 5 | 4.32 | 10.0 |
| 6 | 4.76 | 12.0 |
| 7 | 4.50 | 13.4 |
| 8 | 4.15 | 15.9 |
| 9 | 3.80 | 20.0 |
| 10 | 3.50 | 21.0 |
| 11 | 3.15 | 23.0 |
| 12 | 2.80 | 23.5 |
| 13 | 2.47 | 20.0 |
| 14 | 2.07 | 18.0 |
| 15 | 1.50 | 10.0 |
| 16 | 0.50 | 4.7 |

The mid-fractions 5-8, inclusive, were reserved for evaporation or other treatment to recover crystalline magnesium chloride therefrom. Fractions 1, 2, 15, and 16 were discarded. The fractions 3, 4, and 9-14, inclusive, were separately treated in all except one instance, with sufficient solid sodium chloride so that they contained the following amounts of magnesium chloride and sodium chloride, expressed as per cent by weight.

TABLE II

*Fractions treated with NaCl*

| Fraction No. | MgCl₂ | NaCl |
| --- | --- | --- |
|  | Per cent | Per cent |
| 3 | 2.36 | 8.5 |
| 4 | 2.87 | 23.0 |
| 9 | 3.70 | 22.0 |
| 10 | 3.42 | 22.7 |
| 11 | 3.14 | 23.3 |
| 12 | 2.79 | 23.7 |
| 13 | 2.34 | 24.1 |
| 14 | 1.90 | 24.6 |

After the exchange agent had again become saturated with magnesium ions by the passage of sea water over the same, the introduction of sea water was discontinued and the fractions shown in the above Table II were consecutively fed into the beds of exchange agent for the purpose of displacing magnesium ions from the latter and regenerating additional magnesium chloride solution. After all of the above fractions had been fed into the beds, 5 gallons of a saturated aqueous sodium chloride solution was introduced for the purpose of completing the magnesium chloride regeneration reaction. The introduction of sea water to the beds was then resumed. As in the preceding cycle of the process, the regenerated magnesium chloride solution was collected in successive fractions during its flow from the exchange agent. The fractions of regenerated magnesium chloride solution collected were practically the same as those identified in Table I. Again the mid-fractions 5-8 of the regenerated magnesium chloride solution, which fractions contained an average of 4.44 per cent by weight of magnesium chloride, were reserved for evaporation and the other fractions were recycled or otherwise disposed of as hereinbefore indicated. It will be noted that the total volume (24 gallons) of regenerated magnesium chloride solution collected in a given cycle is greater than the volume (17 gallons) of liquor which had been fed to the exchange agent to displace magnesium ions from the latter and regenerate the magnesium chloride. This apparent increase in volume is due to dilution of the regenerated magnesium chloride solution with sea water.

EXAMPLE 3

The cyclic mode of operation described in Example 2 was repeated using the same kind and quantity of exchange agent in the form of beds of the same total depth, the only change in procedure being in the step of treating the exchange agent with sea water. In each operative cycle of the present experiment, undiluted sea water was fed into the beds until the exchange agent was nearly saturated with absorbed magnesium ions, after which the inflowing sea water was diluted with increasing proportions of fresh water to cause an increase in the absorption of magnesium ions by the exchange agent. Toward the end of this step of the process, the brine flowing into the beds consisted of 1 part by volume of sea water diluted with 2 parts of fresh water. Except for the concentration of sodium chloride and magnesium chloride in the solution used for displacing the absorbed magnesium ions from the exchange agent, the step of regenerating the magnesium chloride was similar to that described in Example 2. However, due to the increased absorption of magnesium ions on the exchange agent which was brought about by diluting the sea water with fresh water, the concentration of magnesium chloride in the regenerated magnesium chloride solution was considerably higher than in Example 2. Table 3 gives the per cent by weight of magnesium chloride and also of sodium chloride in the successive fractions of the regenerated magnesium chloride solution, each of which fractions amounted to approximately 1.57 gallons of liquor.

TABLE III

Regenerated $MgCl_2$ solution

| Fraction No. | $MgCl_2$ | NaCl |
|---|---|---|
| | Per cent | Per cent |
| 1 | 2.20 | 3.8 |
| 2 | 3.30 | 4.8 |
| 3 | 4.65 | 5.7 |
| 4 | 5.70 | 6.8 |
| 5 | 6.25 | 8.2 |
| 6 | 6.30 | 9.8 |
| 7 | 5.75 | 11.9 |
| 8 | 5.05 | 14.2 |
| 9 | 4.45 | 16.3 |
| 10 | 3.90 | 18.0 |
| 11 | 3.35 | 19.0 |
| 12 | 2.80 | 18.1 |
| 13 | 2.35 | 16.0 |
| 14 | 2.02 | 13.7 |
| 15 | 1.62 | 11.5 |

The mid-fractions 4–7, inclusive, amounting to a total of 6.28 gallons of liquor containing an average of 6 per cent by weight of magnesium chloride, were reserved for evaporation to recover crystalline magnesium chloride therefrom. Fractions 1, 14 and 15 were discarded. The other fractions were recycled as in Example 2, the fractions 3 and 8–13 being treated with solid sodium chloride prior to recycling. Table IV gives the composition of the fractions at the time when they were recycled, e. g. after treatment with the solid sodium chloride.

TABLE IV

Fractions as recycled

| Fraction No. | $MgCl_2$ | NaCl |
|---|---|---|
| | Per cent | Per cent |
| 2 | 3.30 | 4.8 |
| 3 | 3.85 | 22.0 |
| 8 | 4.65 | 21.1 |
| 9 | 4.14 | 22.2 |
| 10 | 3.66 | 23.0 |
| 11 | 3.16 | 23.5 |
| 12 | 2.60 | 24.0 |
| 13 | 2.11 | 24.6 |

After the base exchange agent had been resaturated with magnesium ions by the passage of sea water over the same, the introduction of sea water was discontinued and the above fractions of liquor in the order given were fed at a rate of 0.6 gallon per minute into the beds of exchange agent for the purpose of displacing the absorbed magnesium ions from the agent and regenerating additional magnesium chloride. When all of the fractions just mentioned had been fed into the bed, 5 gallons of a saturated sodium chloride solution was introduced for the purpose of completing the magnesium chloride regeneration reaction. The introduction of sea water to the beds was then resumed as hereinbefore described. During these operations the regenerated magnesium chloride solution flowing from the beds of exchange agent was collected as a series of successive fractions which were of approximately the same volume and composition as those shown in Table III. Again the mid-fractions 4–7 of the regenerated magnesium chloride solution were reserved for evaporation to recover crystalline magnesium chloride therefrom and the other fractions were enriched with sodium chloride and recycled, or otherwise disposed of, as described above. Thus, in each cycle of the process there was an output of 6.28 gallons of liquor containing 6 per cent by weight of magnesium chloride. The over all yield of magnesium chloride as the regenerated solution of approximately 6 per cent concentration, after several cycles of operation, corresponded to a recovery of more than 75 per cent of the magnesium ions absorbed from the sea water by the exchange agent.

Other modes of applying the principle of the invention may be employed instead of those explained, change being made as regards the method herein disclosed, provided the step or steps stated by any of the following claims or the equivalent of such stated step or steps be employed.

We therefore particularly point out and distinctly claim as our invention:

1. In a method for producing magnesium salts in a more concentrated form from an aqueous brine, the steps of absorbing magnesium ions from a brine which contains between 0.01 and 0.4 gram atomic weight of magnesium ions per liter and contains between 2 and 40 gram atomic weights of alkali metal ions per gram atomic weight of the magnesium ions by passing the brine into contact with a base exchange agent and thereafter treating the exchange agent with a stream of an aqueous solution of an ionizable compound other than a magnesium compound, which aqueous solution contains the ionizable compound other than a magnesium compound in a concentration greater than 1.8 normal, whereby absorbed magnesium ions are displaced from the exchange agent with formation of a magnesium salt solution containing the magnesium in higher concentration than in the initial brine.

2. In a method for producing magnesium salts in a more concentrated form from an aqueous brine, the steps of absorbing magnesium ions from a brine which contains between 0.01 and 0.4 gram atomic weight of magnesium ions per liter and contains between 2 and 40 gram atomic weights of alkali metal ions per gram atomic weight of the magnesium ions by passing the brine into contact with a base exchange agent and thereafter treating the exchange agent with a stream of a greater than 1.8 normal aqueous solution of an agent selected from the class consisting of alkali metal salts and mineral acids, which solution is sufficiently concentrated to displace the absorbed magnesium ions from the exchange agent with formation of a magnesium salt solution containing the magnesium in higher concentration than in the initial brine.

3. In a method for producing magnesium salts in a more concentrated form from an aqueous brine, the steps of absorbing magnesium ions from a brine which contains between 0.01 and 0.4 gram atomic weight of magnesium ions per liter and contains between 2 and 40 gram atomic weights of alkali metal ions per gram atomic weight of the magnesium ions by passing the brine into contact with a base exchange agent and thereafter treating the exchange agent with a stream of an aqueous sodium chloride solution of at least 15 per cent concentration to displace the magnesium ions from the exchange agent and form an aqueous magnesium chloride solution containing the magnesium in higher concentration than in the brine used as the starting material.

4. In a method for producing magnesium salts in a relatively concentrated form from sea water, the steps which consist in absorbing magnesium ions from the sea water by passing the latter into contact with a base exchange agent and thereafter treating the exchange agent with a stream of an aqueous sodium chloride solution of at least 10 per cent concentration, whereby the absorbed magnesium ions are displaced from the exchange agent with formation of a magnesium chloride solution containing the magnesium in higher concentration than in sea water.

5. In a method for producing magnesium salts in a more concentrated form from sea water, the steps which consist in absorbing magnesium ions from the sea water by passing the latter over a base exchange agent while gradually diluting the inflowing sea water with increasing amounts of fresh water until the brine being passed into contact with the exchange agent consists of sea water diluted with at least an equal volume of fresh water and continuing passage of the diluted sea water over the exchange agent until the proportion of magnesium ions absorbed by the exchange agent is greater than may be absorbed by contacting the exchange agent with undiluted sea water.

6. In a method for producing magnesium salts in a more concentrated form from sea water, the steps which consist in diluting the sea water with at least an equal volume of fresh water and passing the diluted sea water over a base exchange agent until the concentration of magnesium salts in the brine flowing away from the exchange agent approaches the concentration of magnesium salts in the brine being introduced into contact with the exchange agent, and thereafter treating the exchange agent with a stream of an aqueous solution of an agent selected from the class consisting of alkali metal salts and mineral acids, which solution is sufficiently concentrated to displace the absorbed magnesium ions from the exchange agent with formation of a magnesium salt solution containing the magnesium in higher concentration than in sea water.

7. In a method for producing magnesium salts in a more concentrated form from sea water, the steps which consist in absorbing magnesium ions from the sea water by passing the latter over a base exchange agent while gradually diluting the inflowing sea water with increasing amounts of fresh water until the brine being passed into contact with the exchange agent consists of sea water diluted with at least an equal volume of fresh water, continuing passage of the diluted sea water over the exchange agent until the magnesium content of the brine flowing away from the exchange agent approaches that of the brine being introduced into contact with the exchange agent, and thereafter treating the exchange agent with a stream of a sufficiently concentrated aqueous solution of an alkali metal salt to displace absorbed magnesium ions from the exchange agent with formation of a magnesium salt solution containing the magnesium in higher concentration than in sea water.

8. In a method for producing magnesium salts in a more concentrated form from sea water, the steps which consist in absorbing magnesium ions from the sea water by passing the latter over a base exchange agent while gradually diluting the inflowing sea water with increasing amounts of fresh water until the brine being passed into contact with the exchange agent consists of sea water diluted with at least an equal volume of fresh water, continuing the introduction of the diluted sea water until the concentration of magnesium salts in the brine flowing away from the exchange agent approaches that of the brine being introduced into contact with the exchange agent, and thereafter treating the exchange agent with a stream of an at least 15 per cent concentrated aqueous sodium chloride solution, whereby absorbed magnesium ions are displaced from the exchange agent with formation of a magnesium chloride solution containing the magnesium in higher concentration than in sea water.

9. In a method wherein magnesium ions are absorbed from sea water by contacting the latter with a base exchange agent and the absorbed magnesium ions are thereafter displaced from the exchange agent by passing an aqueous sodium chloride solution of greater than 10 per cent concentration thereover, the steps which consist in collecting the regenerated magnesium chloride solution as successive fractions as it flows from the exchange agent to obtain a mid-fraction which is richest in magnesium chloride and at least one other fraction which contains magnesium chloride in lower concentration but contains more than 10 per cent of sodium chloride, and passing the latter fraction over an exchange agent which is rich in absorbed magnesium ions to displace the latter from the exchange agent with formation of additional magnesium chloride and consequent enrichment of said fraction in magnesium chloride.

10. In a method wherein magnesium ions are absorbed from sea water by contacting the latter with a base exchange agent and the absorbed magnesium ions are thereafter displaced from the exchange agent to regenerate magnesium chloride by passing an aqueous sodium chloride solution of at least 10 per cent concentration over the exchange agent, the steps which consist in collecting the regenerated magnesium chloride solution in successive portions during its flow away from the exchange agent, adding sodium chloride to a fore and final portion of the regenerated magnesium chloride solution (which portions contain the magnesium chloride in lower concentration than in the mid portion) and passing the so-treated fore and final portions of the regenerated magnesium chloride solution over a base exchange agent which is rich in absorbed magnesium ions to displace magnesium ions from the exchange agent with resultant formation of additional magnesium chloride and enrichment of the liquor in regenerated magnesium chloride.

11. In a method for producing magnesium salts in a more concentrated form from sea water, the steps which consist in absorbing magnesium ions from sea water by passing the latter over a base exchange agent while gradually diluting the inflowing sea water with increasing amounts of fresh water until the brine being fed to the exchange agent consists of sea water diluted with at least two volumes of fresh water, continuing passage of the diluted sea water over the exchange agent until the latter is substantially saturated with magnesium ions absorbed from the brine, thereafter passing an aqueous sodium chloride solution of at least 15 per cent concentration over the exchange agent to displace the absorbed magnesium ions and regenerate a magnesium chloride solution, collecting the regenerated magnesium chloride solution in successive portions as it flows away from the exchange agent, enriching a fore-fraction and an end-fraction of the regenerated magnesium chloride solution with sodium chloride by adding the latter thereto so as to render said fractions suitable for use in displacing a further quantity of absorbed magnesium ions from a base exchange agent, and evaporating the mid-fraction of the regenerated magnesium chloride solution to crystallize sodium chloride therefrom and leave as the mother liquor a concentrated magnesium chloride solution.

12. In a method for producing magnesium salts in a more concentrated form from sea water, the steps which consist in absorbing magnesium ions from sea water by passing the latter into a number of beds of a base exchange agent, thereafter displacing magnesium ions from the exchange agent by passing an aqueous alkali metal salt solution into the first of the beds of exchange agent and withdrawing the mid portion of the resultant magnesium salt solution as it flows in linear manner from said first bed of the exchange agent, adding the alkali metal salt in concentrated form to a remaining portion of the regenerated magnesium salt solution to enrich the latter in the alkali metal salt and passing the resultant solution through the second bed of the exchange agent to displace magnesium ions from the latter, thereafter passing sufficient concentrated alkali metal salt solution into said second bed to complete the magnesium ion displacement reaction, and continuing these operations of withdrawing the more concentrated mid portion of the regenerated magnesium salt solution as it flows from a bed of exchange agent and of enriching a remaining portion of the solution with the alkali metal salt, forwarding it to the next bed of exchange agent and then adding to the latter sufficient concentrated alkali metal salt solution to further the displacement of magnesium ions therefrom until the aqueous alkali metal salt solution has been caused to travel in series through the beds and return to the first of said beds as just described, and during these operations again passing sea water into each bed of the exchange agent after the latter has been depleted of absorbed magnesium ions by passage of the aqueous alkali metal salt solution through the same.

13. In a method for producing magnesium salts in a more concentrated form from sea water, the steps which consist in absorbing magnesium ions from sea water by passing the latter in parallel flow through a number of beds of a base exchange agent, thereafter passing an at least 15 per cent concentrated aqueous sodium chloride solution into one of said beds and withdrawing the more concentrated mid portion of the resultant regenerated magnesium chloride solution as the latter flows in linear manner from the bed, adding sodium chloride to a remaining portion of the regenerated magnesium chloride solution and passing it into the second bed of the exchange agent to displace magnesium ions from the latter and regenerate additional magnesium chloride, thereafter introducing sufficient concentrated aqueous sodium chloride solution to said second bed to complete the magnesium ion displacement reaction, and continuing these operations of withdrawing the richest mid portion of the regenerated magnesium chloride solution as it flows from a bed of exchange agent, enriching a remaining portion with added sodium chloride and passing the enriched portion and then a concentrated sodium chloride solution into the next bed until the aqueous sodium chloride solution has been caused to travel in series through the beds and return to the first bed as just described, and during these operations again passing sea water through each bed of the exchange agent after the latter has been depleted of absorbed magnesium ions by passage of the aqueous sodium chloride solution through the same.

14. In a method for producing magnesium salts in a more concentrated form from sea water, the steps which consist in absorbing magnesium ions from sea water by passing the latter through at least one of a number of beds of a base exchange agent while gradually diluting the inflowing sea water with increasing amounts of fresh water until the brine flowing to the bed contains at least one part by volume of fresh water per part of sea water, continuing passage of the diluted sea water through the bed of exchange agent until the proportion of magnesium ions absorbed by the exchange agent is greater than may be absorbed by contacting the exchange agent with undiluted sea water, thereafter passing an at least 15 per cent concentrated aqueous sodium chloride solution into the bed which had been treated with diluted sea water and withdrawing the more concentrated mid portion of the resultant regenerated magnesium chloride solution as the latter flows in linear manner from the bed, adding sodium chloride to a remaining portion of the regenerated magnesium chloride solution and passing it into another bed of exchange agent to displace absorbed magnesium ions from the latter and regenerate additional magnesium chloride, thereafter introducing into the bed sufficient concentrated aqueous sodium chloride solution to complete the magnesium ion displacement reaction, and continuing these operations of withdrawing the richest mid portion of the regenerated magnesium chloride solution as it flows from a bed of exchange agent, enriching a remaining portion with added sodium chloride and passing the enriched portion and then a concentrated sodium chloride solution into the next bed until the aqueous sodium chloride solution has been caused to travel in series through the beds and return to the first bed as just described, and during these operations again passing sea water, with gradual dilution of the latter with fresh water, into each bed of the exchange agent after the latter has been depleted of absorbed magnesium ions by passage of the aqueous sodium chloride solution through the same.

JOHN J. GREBE.
WILLIAM C. BAUMAN.